US009106730B2

(12) United States Patent
Tsai et al.

(10) Patent No.: US 9,106,730 B2
(45) Date of Patent: Aug. 11, 2015

(54) ORNAMENT HOLDER FOR A CELLPHONE

(71) Applicant: MYWISH INFORMATION CORP., Taipei (TW)

(72) Inventors: Sheng Wei Tsai, Taipei (TW); Chun Min Chen, Taipei (TW)

(73) Assignee: MYWISH INFORMATION CORP., Taipei (TW)

( * ) Notice: Subject to any disclaimer, the term of this patent is extended or adjusted under 35 U.S.C. 154(b) by 236 days.

(21) Appl. No.: 13/764,778

(22) Filed: Feb. 11, 2013

(65) Prior Publication Data

US 2013/0234001 A1 Sep. 12, 2013

(30) Foreign Application Priority Data

Mar. 9, 2012 (TW) ............................ 101204274 U

(51) Int. Cl.
*H04M 1/215* (2006.01)
*H04M 1/02* (2006.01)
*H04M 1/725* (2006.01)

(52) U.S. Cl.
CPC ............ *H04M 1/215* (2013.01); *H04M 1/0283* (2013.01); *H04M 1/72527* (2013.01)

(58) Field of Classification Search
CPC H04M 1/215; H04M 1/0283; H04M 1/72527

USPC .......... 24/458, 453, 3.15, 671–676, 305, 306, 24/265 EC, 265 H, 265 AL, 3.13
See application file for complete search history.

(56) References Cited

U.S. PATENT DOCUMENTS

| 6,360,408 | B1 * | 3/2002 | Dykstra et al. ................ 24/598.7 |
|---|---|---|---|
| 6,591,461 | B2 * | 7/2003 | Salentine et al. ............. 24/115 F |
| 7,330,355 | B2 * | 2/2008 | Kuo et al. ..................... 361/707 |
| 7,594,305 | B2 * | 9/2009 | Moore ............................. 24/299 |
| 8,692,813 | B2 * | 4/2014 | Yeh ................................. 345/179 |
| 2006/0123605 | A1 * | 6/2006 | Adair ................................. 24/498 |
| 2010/0018015 | A1 * | 1/2010 | Moore ......................... 24/586.11 |
| 2010/0186205 | A1 * | 7/2010 | Stehman, Jr. ................ 24/715.4 |
| 2011/0088230 | A1 * | 4/2011 | Stevens ............................ 24/713 |
| 2014/0049851 | A1 * | 2/2014 | Snell et al. ..................... 359/871 |

* cited by examiner

*Primary Examiner* — Robert J Sandy
*Assistant Examiner* — Rowland Do

(57) ABSTRACT

An ornament holder for a cellphone has a securing member, a connecting member, a cover, an insertion member and a plurality of loops. The cover and the connecting member each has a connector comprising a column, a positioning portion and an engaging portion, and connecting member and the securing member each comprise a concave portion configured to engage with a connector on another of the cover and the connecting member, each concave portion comprising a positioning slot and an engaging slot; the plurality of the loops are used for connecting the securing member, the connecting member and the cover to the insertion member.

7 Claims, 7 Drawing Sheets

ORNAMENT HOLDER FOR A CELLPHONE

BACKGROUND OF THE INVENTION

1. Field of the Invention

The present invention relates to an ornament holder for a cellphone, and more particularly to an ornament holder which is capable of having different combinations 2. Description of Prior Art Nowadays cellphones have became accessories for people, therefore there are various ornament designs for different appearances. However, typical cellphone ornaments are fixed onto the cellphones, which are not convenient for replacement.

Therefore, it is desirable to provide an ornament holder for a cellphone to mitigate and/or obviate the aforementioned problems.

SUMMARY OF THE INVENTION

One characteristic of the embodiment of the present invention is: one end of a securing member is provided with a concaved portion, a positioning slot and an engaging slot.

One characteristic of the embodiment of the present invention is: another end of the securing member is provided with a through hole.

One characteristic of the embodiment of the present invention is: two ends of the connecting member are respectively provided with the concaved portion, the positioning slot and the engaging slot which engage the column, the positioning portion and the engaging portion.

One characteristic of the embodiment of the present invention is: one side of the cover is provided with the column, the positioning portion and the engaging portion.

One characteristic of the embodiment of the present invention is: one end of the insertion member is provided with a through hole.

One characteristic of the embodiment of the present invention is: the connecting member can be various designs.

BRIEF DESCRIPTION OF THE DRAWINGS

FIG. 2 1 is an exploding drawing of the ornament holder according to the embodiment of the present invention.

DETAILED DESCRIPTION OF THE INVENTION

Figure 1:
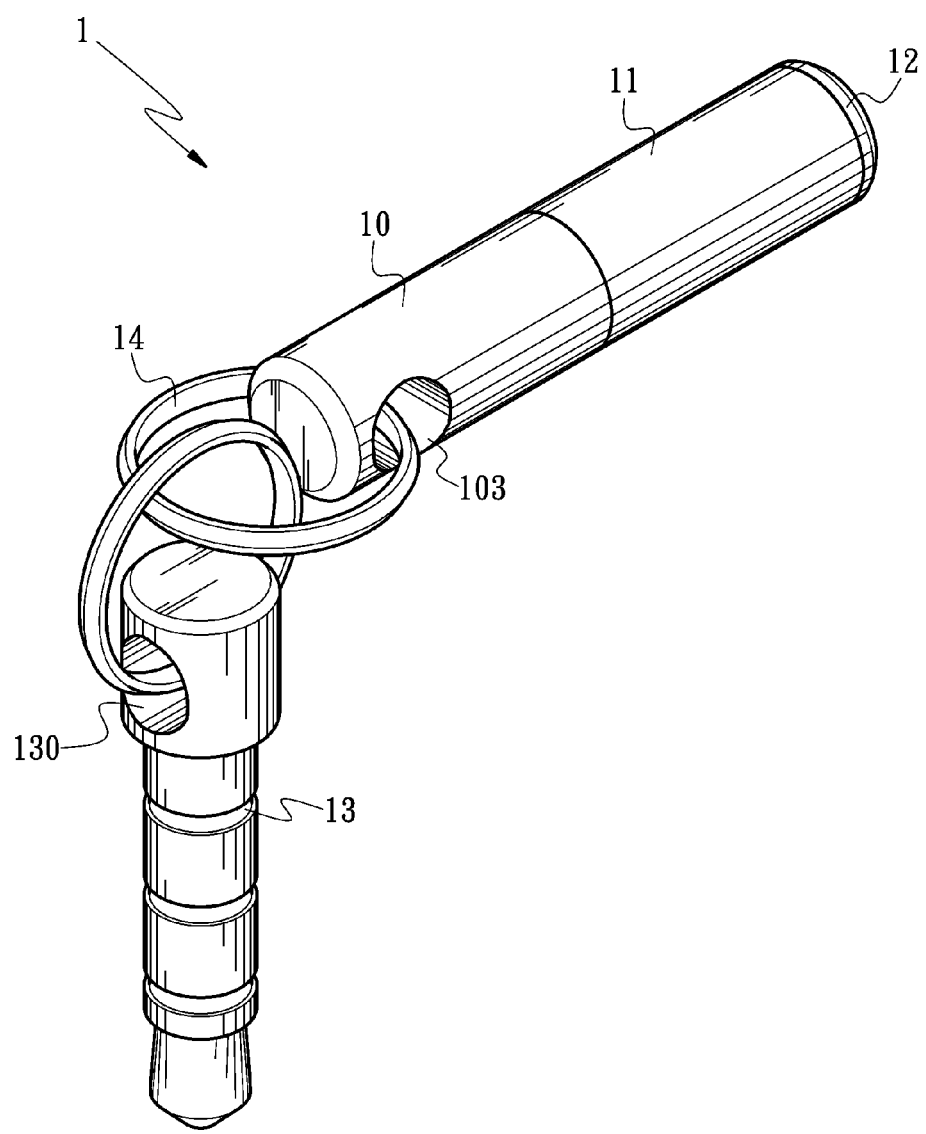
FIG. 1 is a perspective drawing of an ornament holder according to an embodiment of the present invention.
Figure 2:
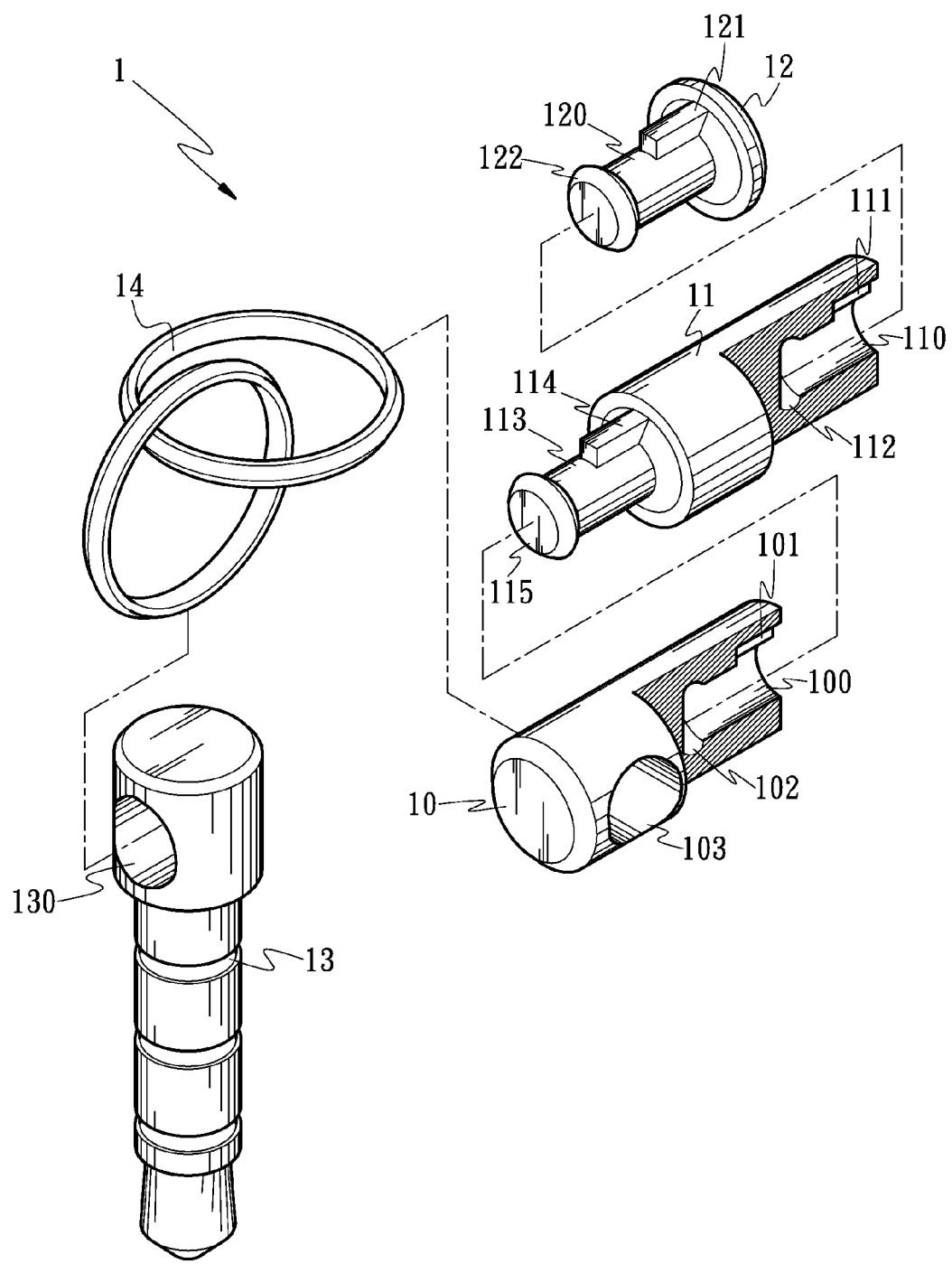

Please refer to FIG. 1 and FIG. 2. The ornament holder 1 comprises a securing member 10, a connecting member 11, a cover 12, an insertion member 13 and a plurality of the loops 14. The securing member 10 is a column tube and provided with a concaved portion 100 and a through hole 103 at two ends. The through hole 103 is corresponding to the loop 14. The concaved portion 10 is further provided with a rectangular positioning slot 101 and a circular engaging slot 102, and the positioning slot 101 and the engaging slot 102 are respectively configured to engage with a positioning portion 114 and a engaging portion 115 on a column 113 of the connecting member 11. The connecting member 11 is a tubal object and provided with a column 113 at one end, the positioning portion 114 is disposed on the column 113, and the engaging portion 115 with a larger diameter is provided at one end of the column 113 which is used for engaging with the concaved portion 100 of the securing member 10. Furthermore, the concaved portion 110 disposed at one end of the connecting member 11, the concaved portion 110 is further provided with the positioning slot 111 and the circular engaging slot 112, and the positioning slot 111 and the engaging slot 112 are respectively used for engaging with a positioning portion 121 and a engaging portion 122 of the column 120 of the cover 12. The cover 12 has a T shape, and a column 120 is provided at one end of the cover 12. The column 120 is provided with a positioning portion 121 and an engaging portion 122 with a larger diameter. The column 120 of the cover 12 correspondingly engages with the concaved portion 110 of the connecting member 11. The insertion member 13 is a T-shaped column and has a through hole 130 at a smaller end. The loop 14 is respectively connected to the securing member 10 and the insertion member 13. The combination of the securing member 10, the connecting member 11 and the cover 12 forms a ornament, the loop 14 attaches the securing member 10, the connecting member 11 and the cover 12 onto the insertion member 13.

Figure 3:
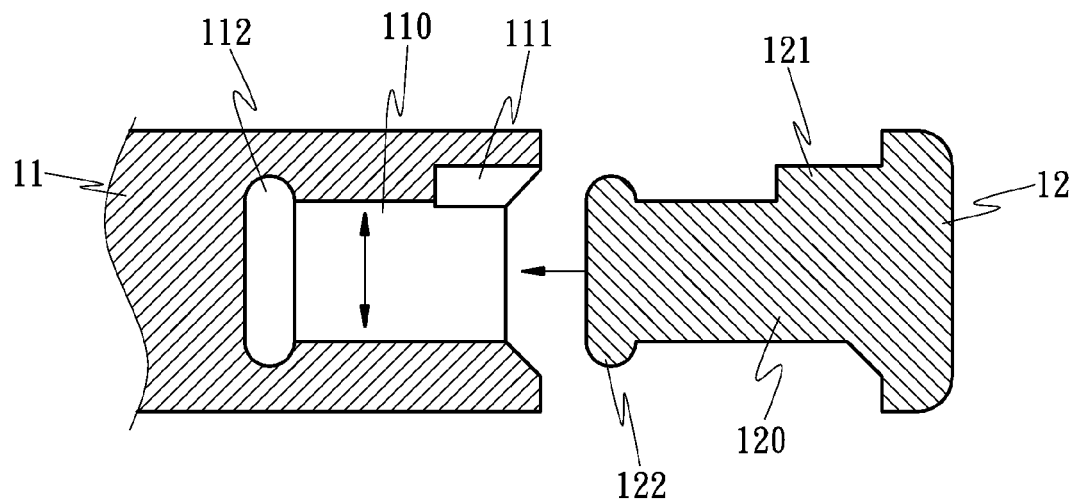
FIG. 3 is a cross-sectional view of the ornament holder according to the embodiment of the present invention.
Figure 4:
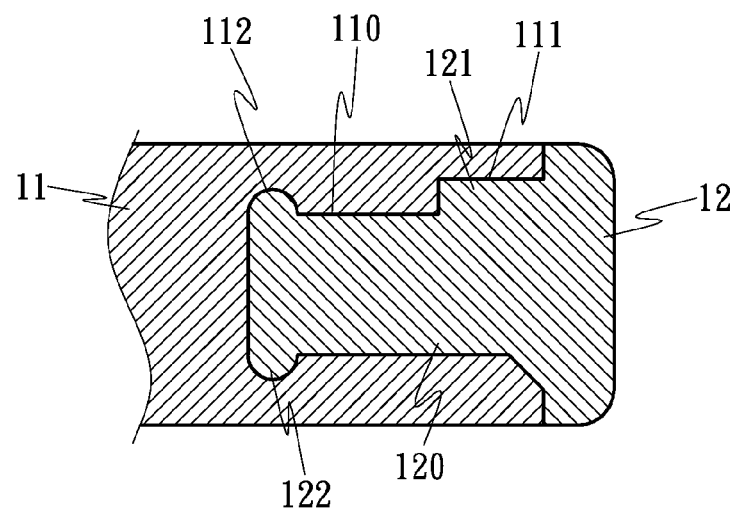
FIG. 4 is another cross-sectional view of the ornament holder according to the embodiment of the present invention.
Figure 5:
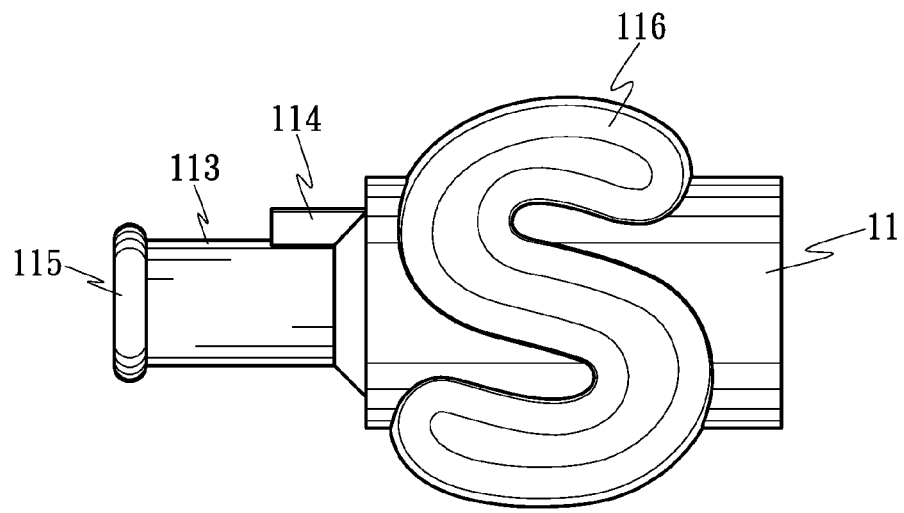
FIG. 5 is a schematic drawing of a connecting member of the ornament holder according to the embodiment of the present invention.
Figure 6:
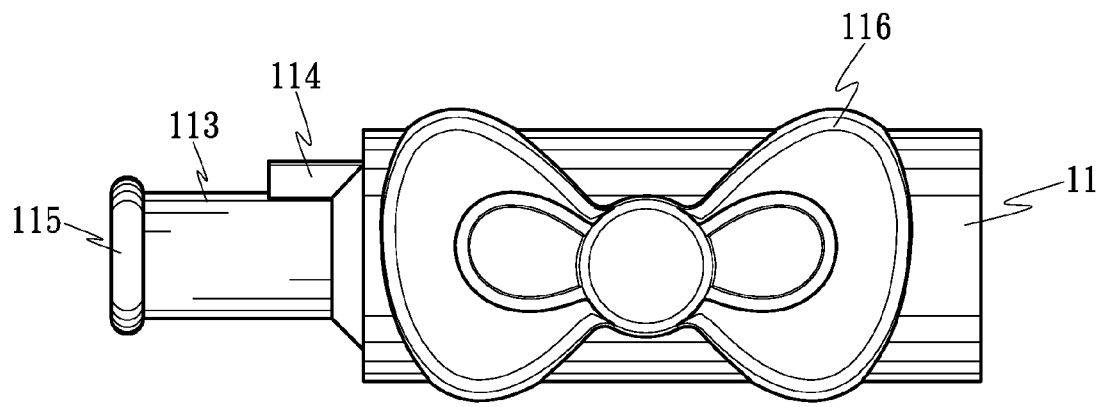
FIG. 6 is another schematic drawing of the connecting member of the ornament holder according to the embodiment of the present invention.
Figure 7:
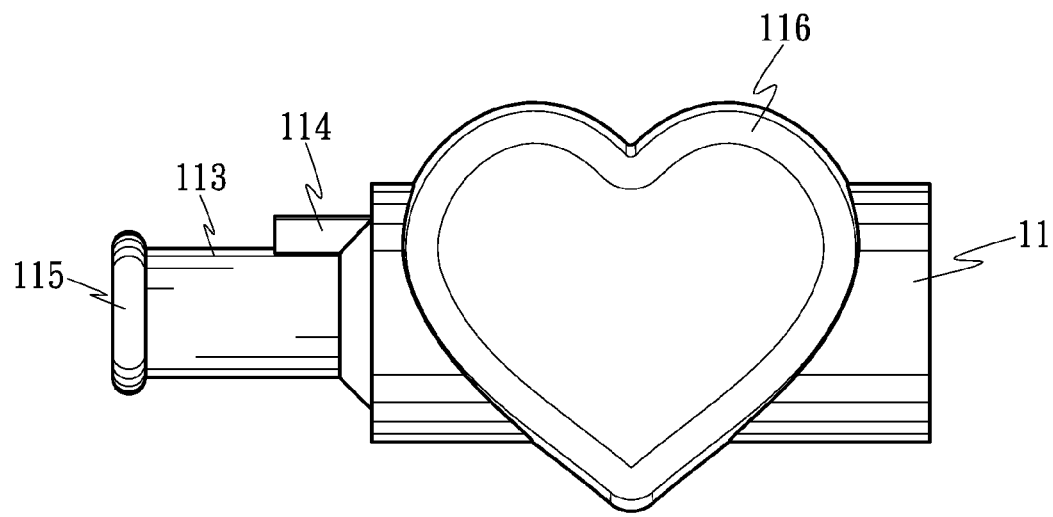
FIG. 7 is another schematic drawing of the connecting member of the ornament holder according to the embodiment of the present invention.
Figure 8:
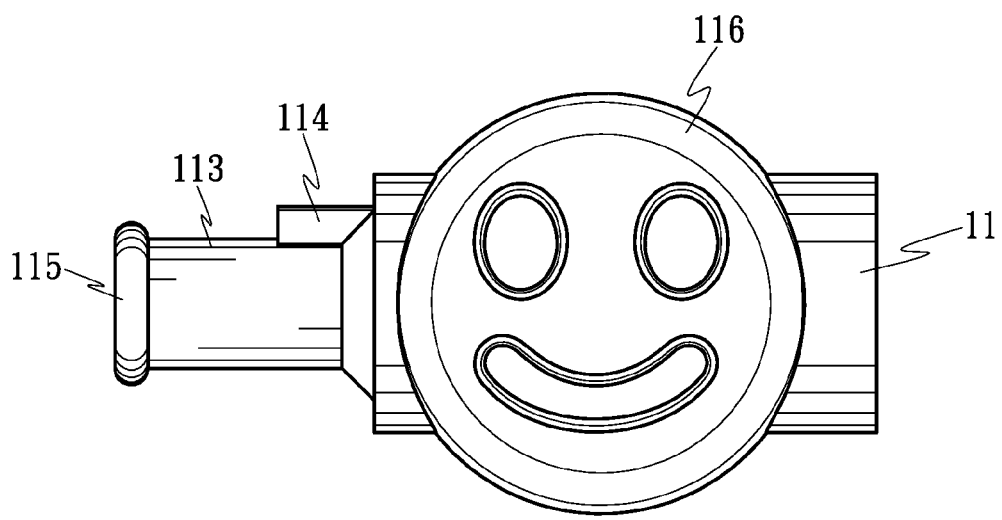
FIG. 8 is another schematic drawing of the connecting member of the ornament holder according to the embodiment of the present invention.

Please refer to FIG. 3 and FIG. 4. As shown in FIG. 3, the connecting member 11 is combined with the cover 12. The concaved portion 110 disposed at one end of the connecting member 11, the concaved portion 110 is further provided with the positioning slot 111 and the circular engaging slot 112. The column 120 is provided at one end of the cover 12, and the column 120 is provided with a positioning portion 121 and an engaging portion 122. For the combination, the column 120 of the cover 12 is inserted into the concaved portion 110 of the connecting member 11, and a peripheral edge of the concaved portion 110 is stretched to make the engaging portion 122 of the column 120 engages with the engaging slot 112 of the concaved portion 110. However, the positioning portion 121 of the cover 12 engages with the positioning slot 111 of the connecting member 11, to secure the cover 12. The above mentioned engagement is also applied between the connecting member 11 and the securing member 10.

Figure 9:
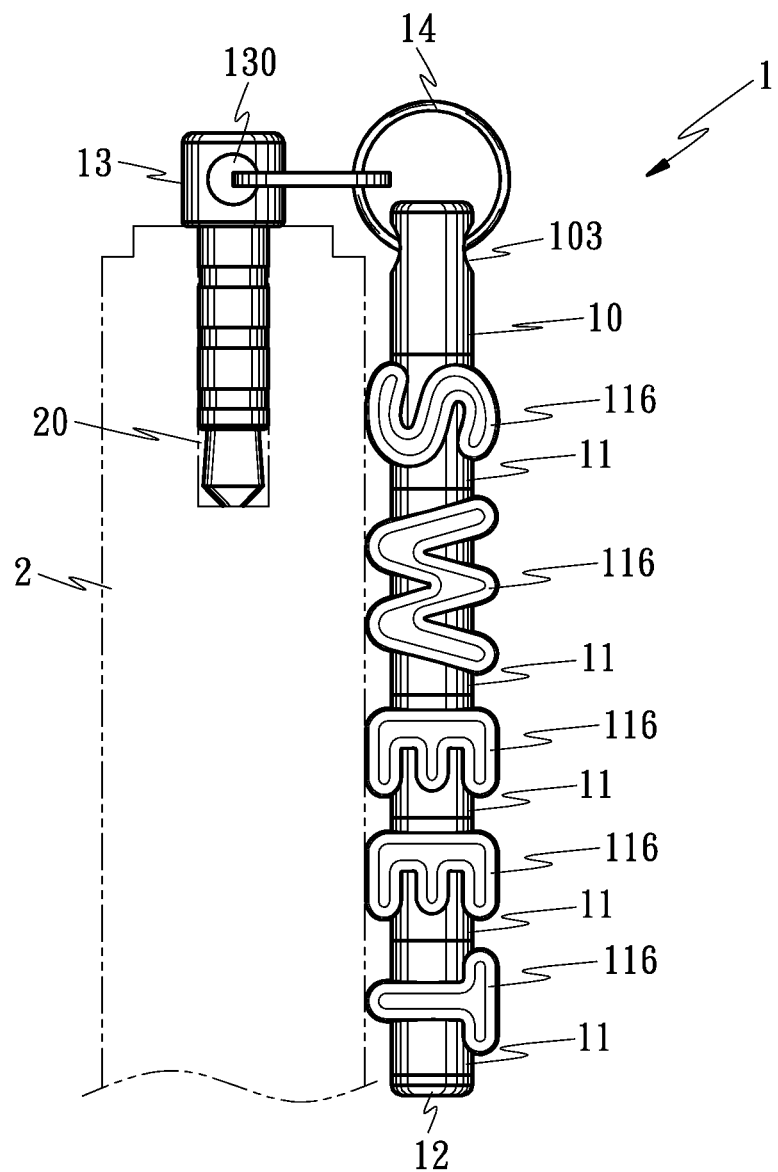
FIG. 9 is a schematic drawing of the ornament holder according to the embodiment of the present invention.
Figure 10:
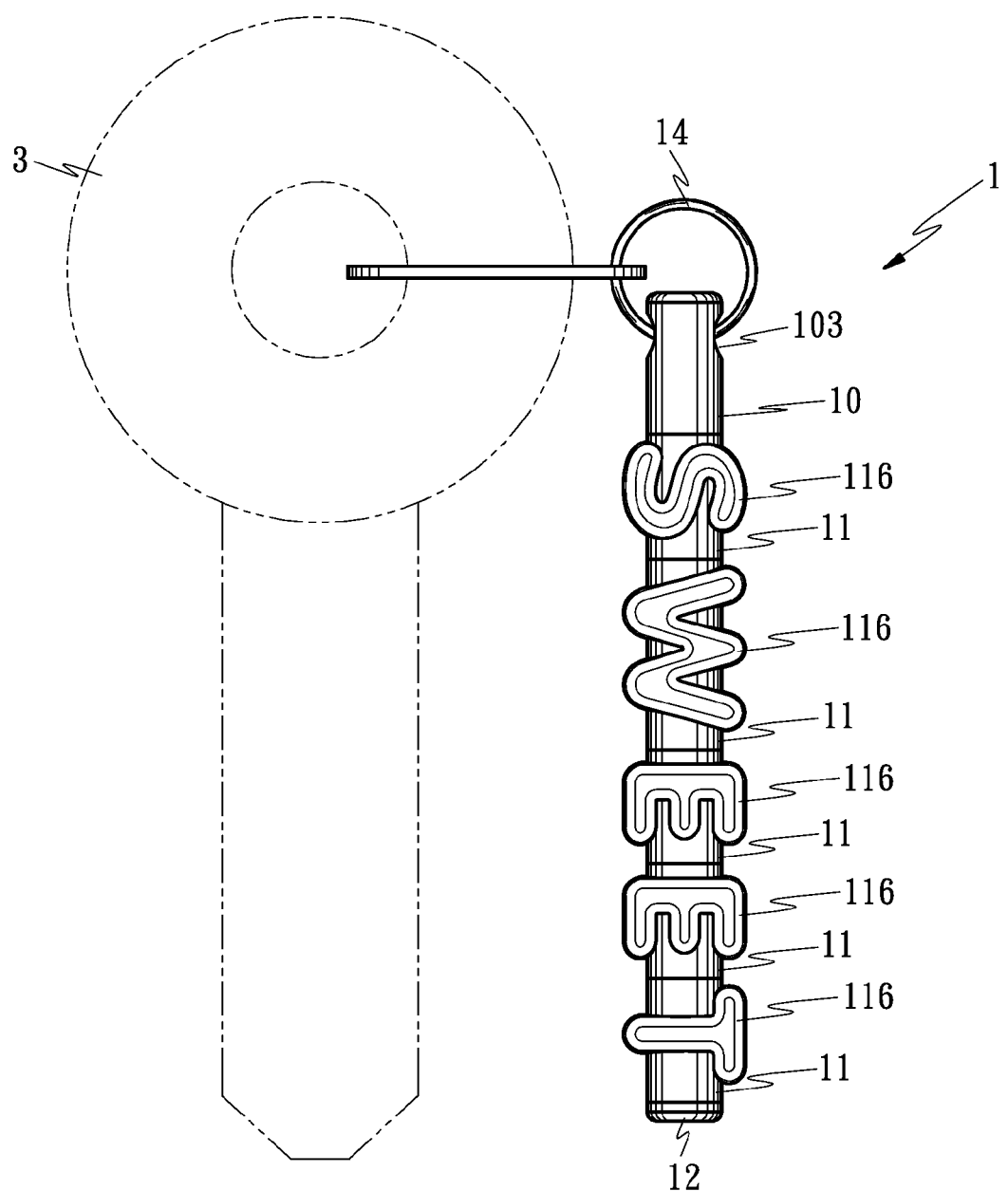
FIG. 10 is a schematic drawing of the ornament holder according to the embodiment of the present invention.

Please refer to FIG. 5, FIG. 6, FIG. 7, FIG. 8, FIG. 9, and FIG. 10. As shown in the drawings, the connecting member 11 can have various ornament 116 designs, such as different letters or figures. As shown in FIG. 9, the ornament design is combined by a plurality of connecting members 11 having English letters, the securing member 10 and the cover 12 are respectively combined at the front end and the rear end, and the loop 14 are used for connecting the securing member 10 and the insertion member 13 together to complete the ornament holder 1. Furthermore, the insertion member 13 can be inserted into an aperture 20 of the cellphone 2, or the loop 14 can be directly connected to a key chain Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An ornament holder for a cellphone comprising: a securing member, a connecting member, a cover, an insertion member and at least a loop; the ornament holder characterized in:

the cover and the connecting member each comprises a connector comprising a column, a positioning portion disposed on the column and an engaging portion disposed on the column, and the connecting member and the securing member each comprises a concave portion configured to matingly engage with the connector on another of the cover and the connecting member, each concave portion comprising a positioning slot to engage with the positioning portion and an engaging slot to engage with the engaging portion;

wherein the loop is used for connecting the securing member to the insertion member.

2. The ornament holder for a cellphone as claimed in claim 1, wherein an end of the securing member is provided with a through hole.

3. The ornament holder for a cellphone as claimed in claim 1, wherein an end of the securing member is provided with the concave portion, the positioning slot and the engaging slot.

4. The ornament holder for a cellphone as claimed in claim 1, wherein an end of the connecting member is provided with the concave portion, the positioning slot and the engaging slot, and an opposing end is provided with the column, the positioning portion and the engaging portion.

5. The ornament holder for a cellphone as claimed in claim 1, wherein a side of the cover is provided with the column, the positioning portion and the engaging portion.

6. The ornament holder for a cellphone as claimed in claim 1, wherein an end of the insertion member is provided with a through hole.

7. The ornament holder for a cellphone as claimed in claim 1, wherein the connecting member comprises a design.

* * * * *